(12) United States Patent
Okada et al.

(10) Patent No.: US 11,168,709 B2
(45) Date of Patent: Nov. 9, 2021

(54) HYDRAULIC DRIVE DEVICE

(71) Applicant: NABTESCO CORPORATION, Tokyo (JP)

(72) Inventors: Isamu Okada, Gifu (JP); Makoto Yoshida, Oshu (JP)

(73) Assignee: NABTESCO CORPORATION, Tokyo (JP)

( * ) Notice: Subject to any disclaimer, the term of this patent is extended or adjusted under 35 U.S.C. 154(b) by 143 days.

(21) Appl. No.: 16/366,186

(22) Filed: Mar. 27, 2019

(65) Prior Publication Data
US 2019/0309769 A1 Oct. 10, 2019

(30) Foreign Application Priority Data

Apr. 4, 2018 (JP) .............................. JP2018-072648

(51) Int. Cl.
*F15B 11/04* (2006.01)
*F15B 7/08* (2006.01)
*G01P 3/44* (2006.01)

(52) U.S. Cl.
CPC ................ *F15B 11/04* (2013.01); *F15B 7/08* (2013.01); *G01P 3/44* (2013.01); *F15B 2211/6336* (2013.01); *F15B 2211/75* (2013.01)

(58) Field of Classification Search
CPC .... F16B 7/08; F16B 11/04; F16B 2211/6336; F16B 2211/75; G01P 3/44
See application file for complete search history.

(56) References Cited

U.S. PATENT DOCUMENTS

| 2002/0142870 | A1* | 10/2002 | Okano | F16H 9/125 474/28 |
| 2011/0083553 | A1* | 4/2011 | Duerr | F04B 1/30 92/5 R |
| 2011/0224878 | A1* | 9/2011 | Nakamura | F16H 61/66259 701/56 |
| 2013/0218429 | A1* | 8/2013 | Ayabe | F16H 61/66259 701/61 |
| 2014/0349816 | A1* | 11/2014 | Akebono | F16H 61/12 477/115 |
| 2015/0027273 | A1* | 1/2015 | Iwase | B60K 6/36 74/665 B |
| 2015/0066312 | A1* | 3/2015 | Sakuda | F15B 15/04 701/50 |
| 2016/0280222 | A1* | 9/2016 | Ono | B60W 10/06 |

(Continued)

FOREIGN PATENT DOCUMENTS

JP 10-257815 A 9/1998
JP 2015-215006 A 12/2015

*Primary Examiner* — Natalie Huls
(74) *Attorney, Agent, or Firm* — Pillsbury Winthrop Shaw Pittman, LLP

(57) ABSTRACT

Provided is a hydraulic drive device configured not to be increased in length in an axial direction. The hydraulic drive device is provided with a body portion for converting energy of a supplied pressure oil into rotational power, the body portion including an output shaft configured to rotate along a rotational axis by the rotational power, a hydraulic block disposed in an extending direction of the output shaft of the body portion and having an oil passage for supplying the pressure oil to the body portion, and a rotation sensor for detecting rotation of the output shaft, at least part of the rotation sensor being disposed in the hydraulic block.

8 Claims, 2 Drawing Sheets

(56) References Cited

U.S. PATENT DOCUMENTS

| | | | |
|---|---|---|---|
| 2017/0276055 A1* | 9/2017 | Nabata | F04B 1/24 |
| 2018/0266551 A1* | 9/2018 | Sakamoto | F16H 61/664 |
| 2019/0309798 A1* | 10/2019 | Okada | F16D 1/101 |
| 2020/0103011 A1* | 4/2020 | Murashima | F16H 61/439 |

* cited by examiner

HYDRAULIC DRIVE DEVICE

CROSS-REFERENCE TO RELATED APPLICATIONS

This application is based on and claims the benefit of priority from Japanese Patent Application Serial No. 2018-072648 (filed on Apr. 4, 2018), the contents of which are hereby incorporated by reference in their entirety.

TECHNICAL FIELD

The present invention relates to a hydraulic drive device and relates particularly to a hydraulic drive device provided with a rotation sensor capable of determining a rotational speed of a motor output shaft.

BACKGROUND

As a traveling drive device of a work machine and the like, there is known a hydraulic drive device provided with a rotation sensor for detecting a rotational speed (namely, the number of rotations) of a hydraulic motor.

Japanese Patent Application Publication No. Hei 10-257815 (the '815 Publication) discloses a vehicle speed detector for a grass mowing machine. In this vehicle speed detector, a rotation detection mechanism for detecting rotation of an output shaft of a hydraulic motor is provided on one end side of the output shaft. A rotary shaft connected to the output shaft is provided so as to penetrate through a hydraulic block. A detection gear of the rotation detection mechanism is mounted to a part of the rotary shaft, the part protruding from the hydraulic block. Via a cover case, an electromagnetic pickup mechanism is mounted to the hydraulic block on a side opposite to a side on which the hydraulic motor is provided. The electromagnetic pickup mechanism detects rotation of the detection gear that rotates integrally with the output shaft and the rotary shaft.

In a case where a rotation sensor for detecting a rotational speed of a motor output shaft is installed in a hydraulic drive device, it is important in designing the drive device to avoid the increase of the entire axial length of the device.

In the above-mentioned vehicle speed detector of the '815 Publication, however, the detection gear of the rotation detection mechanism and the electromagnetic pickup mechanism are mounted to a side surface of the hydraulic block so as to largely protrude from the hydraulic block with respect to an axial direction. Consequently, the drive device as a whole is increased in length in the axial direction.

The hydraulic block in which an oil passage is formed to supply a hydraulic oil to the hydraulic motor is required to be provided adjacently to the hydraulic motor with respect to the axial direction. Furthermore, various pipes and valves are connected to a side surface of the hydraulic block on a radial direction side. For this reason, it is preferable from the viewpoint of a device configuration that the rotation sensor be provided on a side surface portion of the hydraulic block on a side opposite to the hydraulic motor with respect to the axial direction.

SUMMARY

The present invention has been made in view of the above-mentioned circumstances, and it is an object of the present invention to provide a hydraulic drive device configured not to be increased in length in an axial direction.

One aspect of the present invention relates to a hydraulic drive device provided with a body portion for converting energy of a supplied pressure oil into rotational power, the body portion including an output shaft configured to rotate along a rotation axis by the rotational power, a hydraulic block disposed in an extending direction of the output shaft of the body portion and having an oil passage for supplying the pressure oil to the body portion, and a rotation sensor for detecting rotation of the output shaft, at least part of the rotation sensor being disposed in the hydraulic block.

It is possible that, with respect to the extending direction of the output shaft, the body portion is disposed on one side of the hydraulic block, while the rotation sensor is disposed on the other side of the hydraulic block, an end portion of the hydraulic block on the other side has a concave portion, and at least part of the rotation sensor is disposed in the concave portion.

It is possible that the rotation sensor includes a rotary portion and a detection portion for measuring a rotational speed of said rotary portion, the rotary portion is connected to the output shaft and axially rotates together with the output shaft, and the rotation sensor determines a rotational speed of the output shaft with the detection portion measuring the rotational speed of the rotary portion.

A connection part of the rotary portion at which the rotary portion is connected to the output shaft may be disposed in the concave portion of the hydraulic block.

It is possible that the hydraulic drive device further includes an interposition member secured to the hydraulic block, at least part of the interposition member being disposed in the concave portion of the hydraulic block, and the detection portion is secured to the hydraulic block via the interposition member.

It is possible that the output shaft includes a first connection shaft and a second connection shaft connected to each other, the second connection shaft is disposed more distantly than the first connection shaft from the body portion, and the rotary portion is connected to the second connection shaft.

One end portion of the output shaft may be disposed in the concave portion of the hydraulic block.

ADVANTAGES

According to the present invention, it is possible to provide a hydraulic drive device configured not to be increased in length in an axial direction.

DESCRIPTION OF THE PREFERRED EMBODIMENTS

With reference to the appended drawings, the following describes one embodiment of the present invention.

Figure 1:
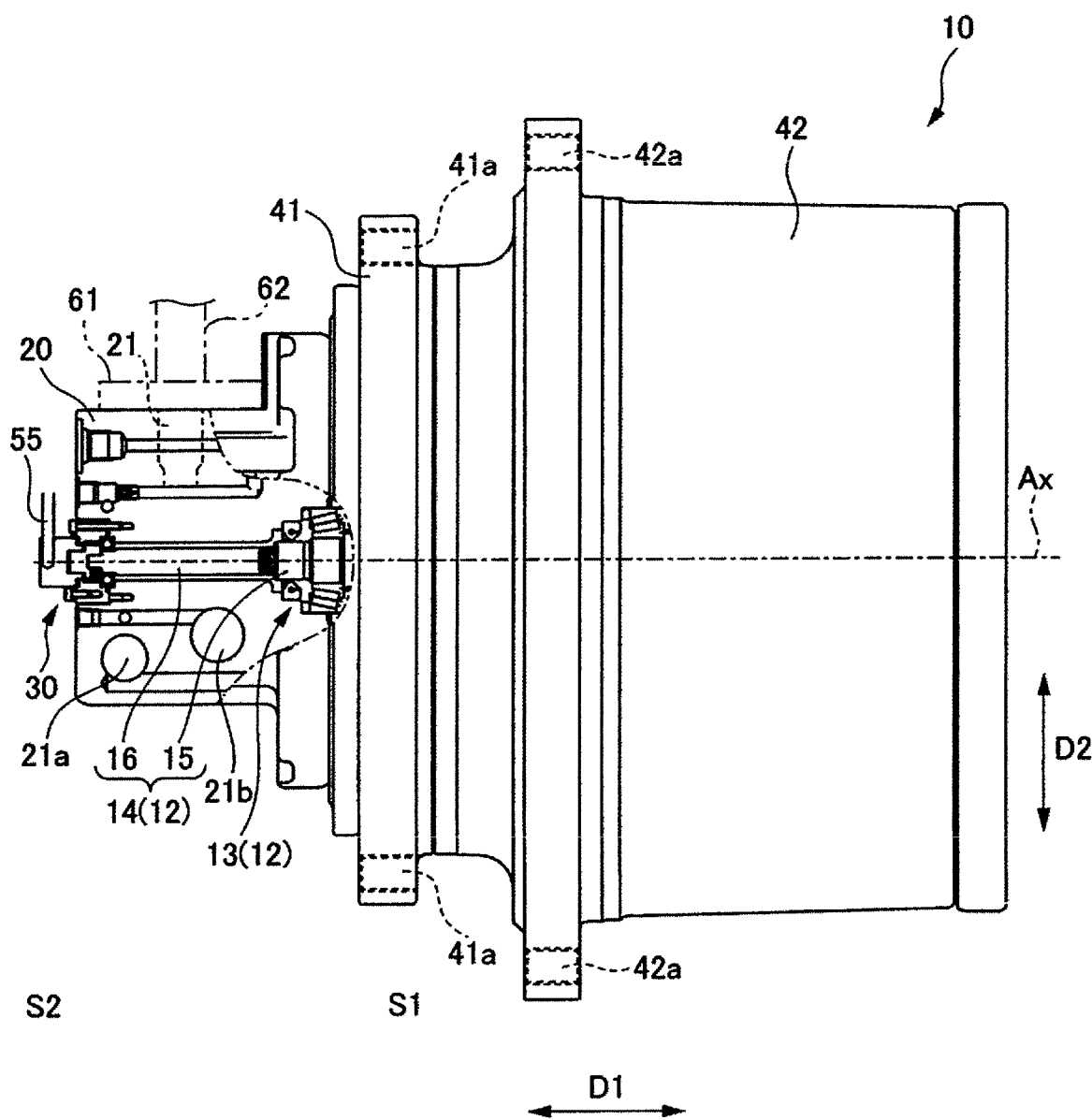
FIG. 1 is a view showing one example of a hydraulic drive device.

FIG. 1 is a view showing one example of a hydraulic drive device 10. For easier understanding, FIG. 1 shows an external appearance state of a body case 41 and a rotary case 42 and illustrates a device configuration in a hydraulic block 20.

The hydraulic drive device 10 includes a hydraulic motor 12, the hydraulic block 20, and a rotation sensor 30. That is, the hydraulic drive device 10 is provided with a body portion 13 for converting energy of a supplied pressure oil into rotational power, the body portion 13 including an output shaft 14 configured to rotate along a rotation axis Ax by using the rotational power, the hydraulic block 20 disposed in an extending direction of the output shaft 14 of the body portion 13 and having an oil passage 21 for supplying the pressure oil to the body portion 13, and the rotation sensor 30 for detecting rotation of the output shaft 14, at least part of the rotation sensor 30 being disposed in the hydraulic block 20.

The hydraulic motor 12 can adopt any configuration in which the hydraulic motor 12 is driven using a hydraulic oil (namely, a pressure oil) supplied from an unillustrated hydraulic source and generates a rotational output. Typically, a gear motor, a vane motor, or a plunger motor can be used as the hydraulic motor 12. The hydraulic motor 12 of this embodiment is configured by an axial-type plunger motor and may have a configuration similar to that of the hydraulic motor disclosed by the '815 Publication.

The hydraulic motor 12 includes the body portion 13 and the output shaft 14. The body portion 13 is disposed inside each of the body case 41 and the rotary case 42, and the output shaft 14 protrudes from the body portion 13 in a rotation axis direction D1 and axially rotates. The body portion 13 convers energy of a supplied hydraulic oil into rotational power (namely, a torque). That is, the body portion 13 receives a hydraulic oil and uses it to generate rotational power. The output shaft 14 axially rotates about the rotation axis Ax and outputs rotational power transmitted thereto from the body portion 13.

The body portion 13 of the hydraulic motor 12 is disposed on one side S1 of the hydraulic block 20 (a right side in FIG. 1) with respect to the rotation axis direction D1, which is an extending direction of the rotation axis Ax (namely, the extending direction of the output shaft 14). The rotation sensor 30 is disposed on the other side S2 of the hydraulic block 20 (a left side in FIG. 1) with respect to the rotation axis direction D1. The body portion 13 of the hydraulic motor 12 as a whole is disposed inside the body case 41 and the rotary case 42, and only part of the body portion 13 is illustrated in FIG. 1.

The output shaft 14 of the hydraulic motor 12 includes a first connection shaft 15 and a second connection shaft 16. The first connection shaft 15 and the second connection shaft 16 are connected to each other and axially rotate integrally with each other about the rotation axis Ax. The second connection shaft 16 is disposed more distantly than the first connection shaft 15 from the body portion 13 of the hydraulic motor 12 and provided so as to penetrate through the hydraulic block 20.

The hydraulic motor 12 further includes an output shaft (hereinafter, referred to also as a "second output shaft," unillustrated) different from the output shaft 14 (hereinafter, referred to also as a "first output shaft") shown in FIG. 1. The second output shaft is disposed inside the rotary case 42. The first output shaft and the second output shaft both extend in the rotation axis direction D1, are connected to each other, and provided so as to be axially rotatable integrally with each other about the common rotation axis Ax. The first output shaft and the second output shaft, however, protrude from the body portion 13 toward opposite directions to each other with respect to the rotation axis direction D1, with the first output shaft (namely, the output shaft 14) protruding from the body portion 13 toward the left side in FIG. 1 and the second output shaft protruding from the body portion 13 toward the right side in FIG. 1. A rotational output of the second output shaft is transmitted to the rotary case 42 via a speed reducer (unillustrated) provided in the rotary case 42. This causes the rotary case 42 to axially rotate about the rotation axis Ax. In an external connection portion 42a, the rotary case 42 is connected to an endless track crawler via a sprocket (unillustrated), and said crawler is driven to rotate through axial rotation of the rotary case 42. The hydraulic motor 12, however, may include a single output shaft instead of the first output shaft and the second output shaft mentioned above.

The body case 41 is connected to a securing member (for example, a track frame) such as a frame of a travel machine via an external connection portion 41a, provided separately from the rotary case 42, and does not axially rotate. The body portion 13 of the hydraulic motor 12 and the hydraulic block 20 are connected to the body case 41, and the body case 41 securely supports the body portion 13 of the hydraulic motor 12 and the hydraulic block 20.

In the hydraulic block 20, there are formed a plurality of oil passages 21 connected to the hydraulic motor 12. A hydraulic oil used to drive the hydraulic motor 12 is caused to flow through the oil passages 21. That is, via the oil passages 21 formed in the hydraulic block 20, a hydraulic oil is supplied to the body portion 13 of the hydraulic motor 12 and is also discharged from said body portion 13. As thus described, in the hydraulic block 20, there are formed an oil passage 21 for supplying a hydraulic oil from the hydraulic source (unillustrated) to the hydraulic motor 12 and an oil passage 21 for discharging the hydraulic oil from the hydraulic motor 12. A pipe 62 for supplying and discharging a hydraulic oil is properly connected to a side surface of the hydraulic block 20 in a radial direction D2, and an element (typically, a valve such as a relief valve or a shuttle valve) for controlling and blocking a flow of the hydraulic oil is disposed as required in the oil passages 21 in the hydraulic block 20. In the hydraulic drive device 10 shown in FIG. 1, the pipe 62 is secured to the side surface of the hydraulic block 20 in the radial direction D2 via a joint member 61 (such as, for example, a split flange fitting (see Japanese Patent Application Publication No. 2015-215006)), and thus supply and discharge of a hydraulic oil at a relatively high pressure between the pipe 62 and the oil passages 21 are appropriately performed. Furthermore, for example, in FIG. 1, a relief valve (unillustrated) may be disposed in an oil passage denoted by a reference character "21a," and a shuttle valve (unillustrated) may be disposed in an oil passage denoted by a reference character "21b." By disposing an element such as any of various types of valves in the oil passages 21 in this manner, it is possible to adjust a pressure of a hydraulic oil in the oil passages 21 and to adjust a flow of the hydraulic oil in the oil passages 21.

The rotation sensor 30 determines a rotational speed of the output shaft 14. As mentioned above, the output shaft 14 rotates in conjunction with rotation of the crawler connected to the hydraulic drive device 10 (the rotary case 42 in this embodiment). Therefore, the rotation sensor 30 can detect a rotational speed of the crawler by determining the rotational speed of the output shaft 14, thus functioning as a sensor for determining a traveling speed of a travel machine such as a work machine provided with said crawler. At least part of the rotation sensor 30 of this embodiment is disposed in a concave portion provided at an end portion of the hydraulic block 20 on the other side (the left side in FIG. 1).

Figure 2:
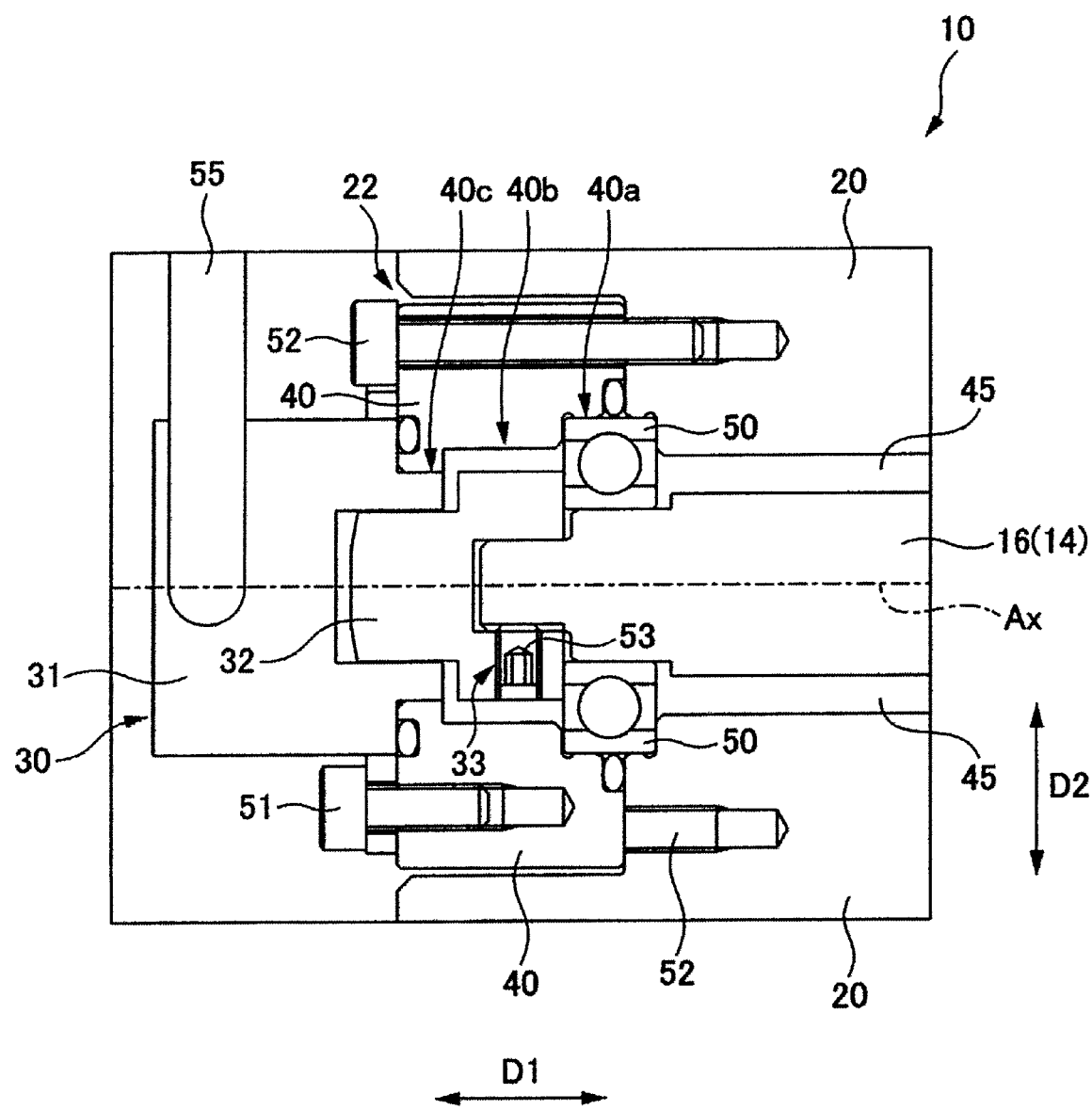
FIG. 2 is a view showing, on an enlarged scale, an internal configuration of part of an end portion of a hydraulic block shown in FIG. 1 on a side on which a rotation sensor is disposed.

FIG. 2 is a view showing, on an enlarged scale, an internal configuration of part of the end portion of the hydraulic block 20 shown in FIG. 1 on a side on which the rotation sensor 30 is disposed.

The rotation sensor 30 includes a rotary portion 32 and a detection portion 31 for measuring a rotational speed of said rotary portion 32. The rotary portion 32 is connected to the second connection shaft 16 (the output shaft 14) and axially rotates together with the second connection shaft 16. The detection portion 31 is connected to a controller (unillustrated) via a wiring portion 55 and transmits a measurement result to the controller. There is no particular limitation on how the detection portion 31 measures the rotational speed of the rotary portion 32. For example, as described in the '815 Publication, the detection portion 31 configured by an electromagnetic pickup mechanism sequentially detects a plurality of teeth formed on an outer peripheral surface of the rotary portion 32, thus being able to measure the rotational speed of the rotary portion 32. The rotation sensor 30 makes the detection portion 31 measure the rotational speed of the rotary portion 32 and thus determines a rotational speed of the second connection shaft 16 (the output shaft 14).

The rotary portion 32 and the detection portion 31 are arranged in a row in the rotation axis direction D1. The rotary portion 32 is disposed in a concave portion 22 formed in the hydraulic block 20, and the detection portion 31 is provided so as to protrude from said concave portion 22 in the rotation axis direction D1.

That is, the end portion of the hydraulic block 20 on the other side (a left side in FIG. 2) has the concave portion 22. The concave portion 22 is formed by recessing part of the end portion of the hydraulic block 20 on the other side from the other side toward one side (namely, from the left side to a right side in FIG. 2) and constituted by a circular columnar space. The concave portion 22 illustrated is provided so as to communicate with a through hole 45 of the hydraulic block 20, in which the second connection shaft 16 extends, and the rotation axis Ax passes through a center of the concave portion 22. With respect to the radial direction D2, which is a direction perpendicular to the rotation axis Ax, the concave portion 22 is larger than the through hole 45. There is, however, no particular limitation on a size of the concave portion 22 in the radial direction D2. The size of the concave portion 22 in the radial direction D2 may be equal to a size of the through hold 45 in the radial direction D2 or larger than the size of the through hole 45 in the radial direction D2.

It is preferable that both of the detection portion 31 and the rotary portion 32 or the rotary portion 32 be disposed so as to at least partially overlap in projection with respect to the radial direction D2 with the joint member 61 shown in FIG. 1. In this case, the hydraulic drive device 10 (particularly, the hydraulic block 20) can be reduced in length in the rotation axis direction D1.

In the concave portion 22 of the hydraulic drive device 10 shown in FIG. 2, in addition to the rotary portion 32, a ring member 40, a bearing 50, and one end portion of the second connection shaft 16 are disposed.

That is, the second connection shaft 16 extends through the through hole 45 and the concave portion 22 and is axially rotatably held by the bearing 50. The one end portion of the second connection shaft 16 disposed in the concave portion 22 is connected to a sensor connection part 33 of the rotary portion 32 via a third securing member 53 such as a screw. As thus described, the connection part 33 of the rotary portion 32 for connecting the second connection shaft 16 (the output shaft 14) and the rotary portion 32 together is disposed in the concave portion 22.

The ring member 40 is an annular interposition member disposed so as to surround the rotary portion 32 with respect to the radial direction D2 and constitutes an intermediate member for securing the detection portion 31 to the hydraulic block 20. The detection portion 31 is secured to the ring member 40 shown in FIG. 2 by use of a first securing member 51, and the ring member 40 is secured to the hydraulic block 20 by use of a second securing member 52. That is, an annular flange part of the detection portion 31, which protrudes in the radial direction D2, is secured to the ring member 40 by use of the first securing member 51 extending in the rotation axis direction D1. Furthermore, the ring member 40 is secured to the hydraulic block 20 by use of the second securing member 52 extending in the rotation axis direction D1. In this manner, the detection portion 31 is secured to the hydraulic block 20 via the ring member 40.

In the hydraulic drive device 10 shown in FIG. 2, an arrangement of the detection portion 31 is adjusted utilizing an arrangement of the bearing 50 provided so as to surround the second connection shaft 16 (namely, the output shaft 14), and thus the detection portion 31 can be accurately adjusted to be arranged at a desired position via the ring member 40. That is, the ring member 40 shown in FIG. 2 has a plurality of different inner diameters at different positions with respect to the rotation axis direction D1 depending on a member disposed inside thereof. Specifically, a part (a fitting portion on the one side S1, see a reference character "40a" in FIG. 2) of the ring member 40, inside which the baring 50 is disposed, has an inner diameter nearly equal to an outer diameter of the bearing 50 and comes in contact with the bearing 50 disposed inside. Furthermore, a part (a fitting portion on the other side S2, see a reference character "40c" in FIG. 2) of the ring member 40, inside which the detection portion 31 is disposed, has an inner diameter nearly equal to an outer diameter of the detection portion 31 disposed inside and comes in contact with the detection portion 31 disposed inside. Furthermore, a part (see a reference character "40b" in FIG. 2) of the ring member 40, inside which the rotary portion 32 is disposed, has an inner diameter larger than an outer diameter of the rotary portion 32 and is disposed apart from the rotary portion 32 so as not to inhibit rotation of the rotary portion 32. With this configuration, a relative positional relationship between the part 40a inside which the bearing 50 is disposed and the part 40c inside which the detection portion 31 is disposed can be accurately adjusted via the ring member 40, and thus respective cores of the detection portion 31 and the rotary portion 32 can be easily and highly accurately aligned with the rotation axis Ax. It is preferable that holes of the ring member 40 for forming the above-mentioned plurality of inner diameters be formed at a time under a predetermined condition. It is preferable that the above-mentioned parts 40a, 40b, and 40c be processed at the same time so that a desired relative positional relationship among the parts 40a, 40b, and 40c are maintained.

The ring member 40 of this embodiment is provided so as to be mountable to/demountable from the hydraulic block 20. In a case where the ring member 40 is not mounted to the hydraulic block 20, a space is formed outside the rotary portion 32 in the radial direction D2. Said space is utilized when the rotary portion 32 (namely, the sensor connection part 33) and the second connection shaft 16 (namely, the output shaft 14) are connected together by using the third securing member 53, and thus this connecting operation can be facilitated.

There is no particular limitation on a shape and size of the ring member 40. The ring member 40, however, has such a shape and size as not to inhibit axial rotation of the second connection shaft 16 and the rotary portion 32 and as to be connectable to the detection portion 31 and the hydraulic block 20. Accordingly, it is preferable that, in the concave portion 22, the ring member 40 be disposed outward of the second connection shaft 16 and the rotary portion 32 with respect to the radial direction D2 and provided so as to be separated from the second connection shaft 16 and the rotary portion 32. Furthermore, it is preferable that a projection image of the detection portion 31 and a projection image of the ring member 40 with respect to the rotation axis direction D1 at least partly overlap with each other. Furthermore, it is preferable that a projection image of the ring member 40 and a projection image of the hydraulic block 20 with respect to the rotation axis direction D1 at least partly overlap with each other.

Furthermore, while a specific configuration of the above-mentioned first securing member 51, the second securing member 52, and the third securing member 53 is also not particularly limited, typically, they can be each configured by a screw. Furthermore, the numbers of first securing members 51, second securing members 52, and third securing members 53 installed and installation positions thereof are also not particularly limited.

As discussed above, according to the hydraulic drive device 10 of this embodiment, at least part of the rotation sensor 30 is disposed in the concave portion 22 of the hydraulic block 20, and thus the hydraulic drive device 10 as a whole can be decreased in length in the rotation axis direction D1. While in the hydraulic drive device 10 shown in FIG. 1 and FIG. 2, the detection portion 31 and the rotary portion 32 are partly disposed in the concave portion 22, one or both of the detection portion 31 and the rotary portion 32 as a whole may be disposed in the concave portion 22. By increasing a ratio of the detection portion 31 and the rotary portion 32 arranged in the concave portion 22, it is possible to reduce an amount of protrusion of the rotation sensor 30 from the hydraulic block 20.

Furthermore, by installing the ring member 40, even in a case where it difficult to directly secure the detection portion 31 to the hydraulic block 20, the detection portion 31 can be appropriately secured to the hydraulic block 20 via the ring member 40. Through the use of the ring member 40 (the interposition member) configured as above, the rotation sensor 30 can be easily applied to the already-existing hydraulic drive device 10, and the drive device as a whole can also be reduced in length in the rotation axis direction D1. Furthermore, with the ring member 40 utilized, for example, a commercially available rotation sensor (namely, a detection portion and a rotary portion) having a preset shape and size can be used in the hydraulic drive device 10 of this embodiment, and thus it is possible not only to reduce a manufacturing cost but also to apply various types of rotation sensors to the hydraulic drive device 10.

While in the hydraulic drive device 10 shown in FIG. 1 and FIG. 2, the ring member 40 as a whole is disposed in the concave portion 22, only part of the ring member 40 may be disposed in the concave portion 22. Furthermore, while in FIG. 1 and FIG. 2, the annular ring member 40 is provided as the interposition member between the detection portion 31 and the hydraulic block 20, a member having any other shape than an annular shape may be provided as said interposition member.

The present invention is not limited to the foregoing embodiment and modification examples but may include various aspects modified variously as could be conceived by those skilled in the art, and the effects provided by the present invention are also not limited to those mentioned above. Accordingly, addition, modification, and partial deletion of the elements recited in the claims and described in the specification can be variously made within the technical idea and the purport of the present invention.

For example, while in the above-mentioned hydraulic drive device 10 shown in FIG. 1 and FIG. 2, part of each of the first securing member 51, the second securing member 52, and the detection portion 31 protrudes from the end portion of the hydraulic block 20 on the other side (a left side end portion thereof in FIG. 1 and FIG. 2), all of these members may be disposed in the concave portion 22. In that case, bulging of the hydraulic block 20 from the end portion thereof on the other side can be decreased. Furthermore, by disposing the wiring portion 55 extending from the detection portion 31 so as not to protrude from the end portion of the hydraulic block 20 on the other side, bulging of the hydraulic block 20 from the end portion thereof on the other side can be decreased or eliminated. For example, a groove (namely, a concave portion separate from the above-mentioned concave portion 22) is formed in an end surface of the hydraulic block 20 on the other side, or a hole is formed in the end portion of the hydraulic block 20 on the other side, and the wiring portion 55 is disposed in the groove or the hole. Thus, the wiring portion 55 can be disposed so as not to protrude from the end portion of the hydraulic block 20 on the other side.

Furthermore, while the ring member 40 is provided in the hydraulic drive device 10 shown in FIG. 1 and FIG. 2, in a case where the detection portion 31 has such a shape and size as to be directly connectable to the hydraulic block 20, the ring member 40 does not have to be provided.

The hydraulic drive device 10 may adopt a configuration other than that in the foregoing embodiment. For example, there is no particular limitation on arrangements, shapes, and constituent elements of the body portion 13, the output shaft 14, the oil passages 21, the hydraulic block 20, and the rotation sensor 30. Furthermore, a specific object whose rotational speed is determined by the rotation sensor 30 that detects rotation of the output shaft 14 is also not limited.

What is claimed is:

1. A hydraulic drive device, comprising:
   an output shaft;
   a body portion for converting energy of a supplied pressure oil into rotational power, the body portion configured to rotate the output shaft along a rotation axis by the rotational power;
   a hydraulic block disposed in an extending direction of the output shaft of the body portion and having an oil passage for supplying the pressure oil to the body portion; and
   a rotation sensor for detecting rotation of the output shaft, at least part of the rotation sensor being disposed in the hydraulic block,
   wherein the body portion is positioned on one side of the hydraulic block in the extending direction of the output shaft and is adjacent to the hydraulic block in the extending direction of the output shaft, while the rotation sensor is disposed next to the hydraulic block on an other side of the hydraulic block in the extending direction of the output shaft and is next to the hydraulic block in the extending direction of the output shaft.

2. The hydraulic drive device according to claim 1, wherein the rotation sensor includes:
   a rotary portion; and a detection portion for measuring a rotational speed of the rotary portion, wherein the rotary portion is connected to the output shaft and axially rotates together with the output shaft, and wherein the rotation sensor determines a rotational speed of the output shaft with the detection portion measuring the rotational speed of the rotary portion.

3. The hydraulic drive device according to claim 2, wherein a connection part of the rotary portion at which the rotary portion is connected to the output shaft is disposed in a concave portion of the hydraulic block.

4. The hydraulic drive device according to claim 2, further comprising:

an interposition member secured to the hydraulic block, at least part of the interposition member being disposed in a concave portion of the hydraulic block, wherein the detection portion is secured to the hydraulic block via the interposition member.

5. The hydraulic drive device according to claim 1, wherein one end portion of the output shaft is disposed in a concave portion of the hydraulic block.

6. The hydraulic drive device according to claim 1, wherein the other side of the hydraulic block includes an end portion, and wherein the end portion of the hydraulic block on the other side is configured to receive the at least part of the rotation sensor therein.

7. A hydraulic drive device comprising:

a body portion for converting energy of a supplied pressure oil into rotational power, the body portion including an output shaft configured to rotate along a rotation axis by the rotational power;

a hydraulic block disposed in an extending direction of the output shaft of the body portion and having an oil passage for supplying the pressure oil to the body portion; and a rotation sensor for detecting rotation of the output shaft, at least part of the rotation sensor being disposed in the hydraulic block, wherein, with respect to the extending direction of the output shaft, the body portion is disposed on one side of the hydraulic block, while the rotation sensor is disposed on an other side of the hydraulic block, wherein an end portion of the hydraulic block on the other side has a concave portion, and wherein at least part of the rotation sensor is disposed in the concave portion.

8. A hydraulic drive device comprising:

a body portion for converting energy of a supplied pressure oil into rotational power, the body portion including an output shaft configured to rotate along a rotation axis by the rotational power;

a hydraulic block disposed in an extending direction of the output shaft of the body portion and having an oil passage for supplying the pressure oil to the body portion; and a rotation sensor for detecting rotation of the output shaft, at least part of the rotation sensor being disposed in the hydraulic block, wherein the rotation sensor includes:

a rotary portion; and a detection portion for measuring a rotational speed of the rotary portion, wherein the rotary portion is connected to the output shaft and axially rotates together with the output shaft, and wherein the rotation sensor determines a rotational speed of the output shaft with the detection portion measuring the rotational speed of the rotary portion, wherein the output shaft includes a first connection shaft and a second connection shaft connected to each other, wherein the second connection shaft is disposed more distantly than the first connection shaft from the body portion, and wherein the rotary portion is connected to the second connection shaft.

\* \* \* \* \*